Oct. 16, 1962 M. FISCHMAN 3,059,141

OSCILLATOR

Filed Sept. 2, 1958

INVENTOR
MARTIN FISCHMAN
BY [signature]
ATTORNEY

United States Patent Office 3,059,141

Patented Oct. 16, 1962

3,059,141
OSCILLATOR

Martin Fischman, Wantagh, N.Y., assignor, by mesne assignments, to Sylvania Electric Products Inc., Wilmington, Del., a corporation of Delaware Filed Sept. 2, 1958, Ser. No. 758,417
4 Claims. (Cl. 315—27)

My invention is directed toward sawtooth current generators for producing current pulses having a sawtooth waveform.

It is an object of my invention to provide a new type of sawtooth current generator particularly suitable for television and other uses requiring electromagnetic scanning.

Another object is to provide a new type of sawtooth current generator incorporating a single transistor wherein the width of the current pulses is readily adjustable and wherein the time spacing between adjacent pulses is determined by a resonant circuit.

In accordance with the principles of my invention, my sawtooth current generator comprises a transistor having base, emitter, and collector electrodes, a voltage source, a transformer (which can be an auto-transformer) having first and second electromagnetically intercoupled windings, and a resistor. The voltage source and one transformer winding are connected in series between the emitter and collector electrodes. The resistor and the other transformer winding are connected in series between the base electrode and a selected one of the emitter and collector electrodes to form a regenerative feedback loop between the base electrode and the selected one electrode. This other winding together with the stray capacitance of the generator (and, where necessary, together with an additional capacitor connected across this winding) constitutes a resonant circuit tuned to a predetermined frequency.

This generator produces equidistantly spaced current pulses having a sawtooth waveform, these pulses flowing through the collector electrode. As will be explained in more detail hereinafter, the pulse width or duration is determined by the value of the aforementioned resistor and decreases as this value increases. Further, the time separation between adjacent pulses is determined by the frequency of the resonant circuit and decreases as this frequency increases.

Illustrative embodiments of my invention will now be described with reference to the accompanying drawing wherein.

Figure 1:
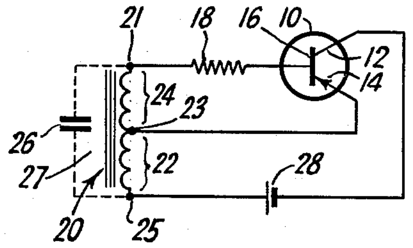
FIGS. 1, 2 and 3 are circuit diagrams of sawtooth current generators in accordance with the invention.

Referring now to FIG. 1, battery 28 and winding 22 of autotransformer 20 are connected in series between the emitter electrode 14 and the collector electrode 12 of transistor 10. Resistor 18 and winding 24 of autotransformer 20 are connected in series between the emitter electrode 14 and the base electrode 16 of transistor 10. Windings 24 and 22 are shunted by the stray capacitance 26 of the various components to form a resonant circuit 27.

Figure 5:
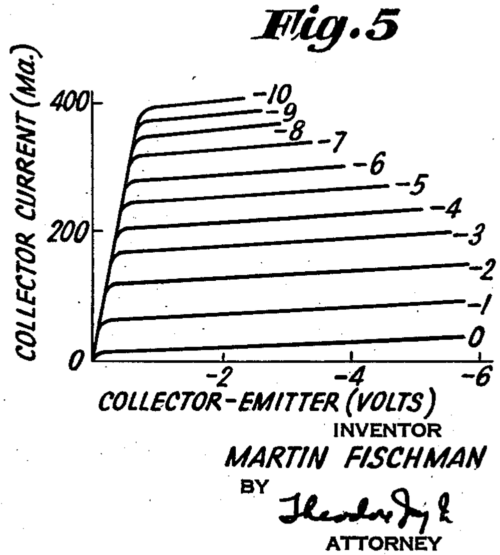
FIG. 5 is a graph of the static electrical characteristics of the transistor shown in FIGS. 1–3.

The static electrical characteristics of a typical transistor 10 are shown in FIG. 5. It will be seen that for sufficiently high values of the collector to emitter voltage (known as the saturation region) the collector current (for any selected value of base current) increases very slowly as the collector to emitter voltage increases. However, for sufficiently low values of the collector to emitter voltage, the collector current increases rapidly at a constant rate as the collector to emitter voltage increases. The transition region between rapidly changing collector currents and slowly changing collector regions is represented by the knee of the various curves of FIG. 5, the actual collector to emitter voltages for any transition region being determined by the selected value for the base current.

The circuit of FIG. 1 operates in the following manner. Initially, because of the regenerative feedback loop constituted by resistor 18 and autotransformer 20 interconnecting the base electrode 16 and the emitter electrode 14 of transistor 10, the transistor operates below the saturation region of its characteristic. The transformer and electrode voltages remain in an equilibrium as long as the transistor is so operated. Under these conditions, the base current $I_b$ through base electrode 16 is equal to the voltage difference between the end 21 of transformer 20 adjacent the base electrode 16 and the tap 23 of this transformer divided by the resistance R of resistor 18.

The collector current $I_c$ then begins to increase at a constant rate from an initial zero value in accordance with the formula $$I_c = Vt/L$$

wherein $t$ is the elapsed time, V is the voltage of battery 28, and L is the reflected inductance at the transformer 20 as measured between tap 23 of the transformer and the end 25 of the transformer remote from the base electrode.

The collector current continues to increase until its value approaches that established in the region of the knee of the particular characteristic curve of FIG. 5 that is being utilized (i.e. that curve corresponding to the particular value of the base current $I_b$ previously established).

When the knee is reached, the rate of change of the collector current decreases sharply, and the transformer voltage begins to drop. As a result, the base current is reduced, and the collector current necessarily is reduced. Due to the regenerative feedback loop, this process continues rapidly until the transistor is quickly cut off and no collector current flows.

Figure 4:
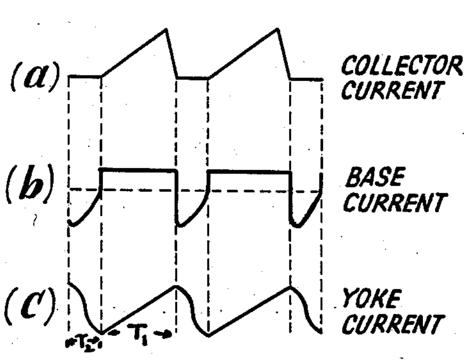
FIG. 4 shows current and voltage waveforms at various points of the circuits of FIGS. 1–3.

The transformer voltage then swings through a half cycle of sine wave oscillation (the frequency of which is determined by the resonant circuit 27). Thereafter, the transistor again is triggered into the saturation region of its characteristic and the entire process is repeated. The base current therefore has the wave form illustrated in FIG. 4*b*. The wave form of the collector current is shown in FIG. 4*a*, wherein the width or duration of the sawtooth pulses is the period $T_2$ and the period or time separation between adjacent pulses is $T_1$.

As will be apparent from FIG. 5, as the base current is increased or decreased, the collector current attains correspondingly higher or lower maximum values, and the time period required for this current to change from zero to a maximum value (this period is effectively $T_2$) correspondingly increases or decreases. The base current can be increased or decreased by correspondingly decreasing or increasing the resistance R of resistor 18. Hence, the pulse width or duration is determined by the value of resistor 18 (which for a fixed supply voltage and transformer ratio determines the base current).

The period $T_1$ is equal to the time required for the resonant circuit to swing through a half cycle of damped sine wave oscillation of resonant circuit 27. This period therefore is determined by the resonant frequency and is increased or decreased as the frequency is correspondingly decreased or increased.

In the circuits described herein, the collector current and the emitter currents are almost equal. More particularly, the emitter current is equal to the sum of the collector current and the base current, and the base current is extremely small in comparison to either of the collector or emitter currents.

Figure 2:
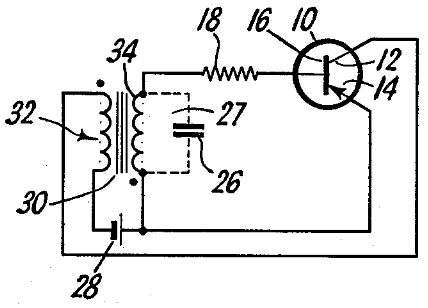

Hence, the regenerative feedback loop which in FIG. 1 interconnects the base and emitter electrodes of the transistor, can be shifted to interconnect the base and collector electrodes of the transistor as shown in FIG. 2, and the operation will be essentially the same.

The circuit diagrams of FIGS. 1 and 2 differ only in that the autotransformer 20 of FIG. 1 with windings 22 and 24 is replaced by the transformer 30 with corresponding windings 32 and 34.

In order to use the arrangement of FIGS. 1 and 2, for example to supply the horizontal scanning signals to a cathode ray tube, a horizontal deflection yoke must be connected therein. One such arrangement is shown in FIG. 3.

Figure 3:
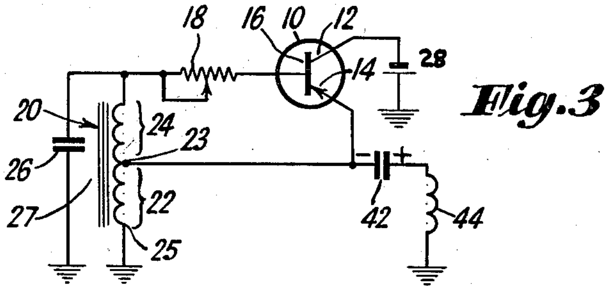

In FIG. 3, the positive terminal of battery 28 is grounded and a deblocking capacitor 42 and a yoke inductance 44 are connected in series across points 23 and 25 of the autotransformer, and resistor 18 is variable; this circuit diagram is otherwise the same as FIG. 1.

In FIG. 3 the current flowing through the yoke inductance has the sawtooth wave form shown in FIG. 4*c*. Typical circuit values for FIG. 3 are as follows: yoke inductance 44—1 millihenry; winding 22—(100 turns) 10 millihenries; winding 24—(200 turns) 40 millihenries; resistor 18—1800 ohms (for a horizontal frequency of 15,750 cycles per second); capacitor 26—100 micromicrofarads; capacitor 42—10 microfarads. The transistor can be a type commercially designated as a 2N270 and battery 28 can have a value of 5 volts.

It will be apparent that transistors of either pnp or npn types can be used by appropriately establishing the polarity of battery 28 in the circuit diagrams shown.

Since the battery voltage V directly affects the rate of change of collector current, it would appear that the puse width $T_2$ would depend upon the value of V. However, voltage V also directly affects the transformer voltages and consequently the base current. The base current and the rate of change of collector current both vary in the same direction as V changes and thus provide a compensating action. The net result is that changes of V have very little effect on the pulse width. More particularly in the circuit of FIG. 3, as the battery voltage changes from 5 v. to 1 v. the pulse width changes by less than 10%.

What is claimed is:

1. An oscillator for producing current pulses having a sawtooth wave form, said pulses having a duration $T_2$ and a time separation between adjacent pulses $T_1$, said oscillator comprising a transistor having base, collector, and emitter electrodes; a resonant circuit including a transformer having first and second series-connected electromagnetically coupled windings; a resistor coupled between the base of said transistor and the first winding of said transformer; means coupling the second winding of said transformer to the collector of said transistor; means coupling the junction of said first and second windings to the emitter of said transistor; and an inductive element conductively coupled to said transformer, the time separation $T_1$ between adjacent pulses being fixed for a given inductive element by the characteristics of said resonant circuit.

2. An oscillator for producing current pulses having a sawtooth wave form, said pulses having a duration $T_2$ and a time separation between adjacent pulses $T_1$; said oscillator comprising a transistor having base, collector, and emitter electrodes; a resonant circuit including a transformer having first and second series-connected electromagnetically coupled windings and a capacitor connected across said series-connected windings; a resistor coupled between the base of said transistor and the first winding of said transformer; means coupling the junction of said first and second windings to the emitter of said transistor; means coupling the second winding of said transformer to the collector of said transistor; and an inductive element conductively coupled to said transformer, the time separation $T_1$ between adjacent pulses being fixed for a given inductive element by the characteristics of said resonant circuit.

3. An oscillator for producing current pulses having a sawtooth wave form, said pulses having a duration $T_2$ and a time separation between adjacent pulses $T_1$; said oscillator comprising a transistor having base, collector, and emitter electrodes; a resonant circuit including an autotransformer having first and second series-connected electromagnetically coupled windings having a fixed turns ratio; a resistor coupled between the base of said transistor and the first winding of said autotransformer; means coupling the junction of said first and second windings to the emitter of said transistor; a voltage source coupled between the second winding of said autotransformer and the collector of said transistor; and an inductive deflection element conductively coupled to said transformer, the time separation $T_1$ between adjacent pulses being fixed for a given deflection element by the characteristics of said resonant circuit, and the duration $T_2$ of said pulse being determined by the values of said resistor, said voltage source and said turns ratio.

4. An oscillator for producing current pulses having a sawtooth waveform, said pulses having a duration $T_2$ and a time separation between adjacent pulses $T_1$; said oscillator comprising a transistor having base, collector, and emitter electrodes; a resonant circuit including an autotransformer having first and second series-connected electromagnetically coupled windings having a fixed turns ratio and a capacitor connected across said series connected windings; a resistor coupled between the base of said transistor and the first winding of said autotransformer; means coupling the junction of said first and second windings to the emitter of said transistor; a voltage source coupled between the second winding of said autotransformer and the collector of said transistor; and an inductive deflection element conductively coupled to the junction of said first and second winding of said transformer, the time separation $T_1$ between adjacent pulses being fixed for a given deflection element by the characteristics of said resonant circuit, and the duration $T_2$ of said pulse being determined by the values of said resistor, said voltage source, and said turns ratio.

References Cited in the file of this patent

UNITED STATES PATENTS

| | | |
|---|---|---|
| 2,780,767 | Janssen | Feb. 5, 1957 |
| 2,847,569 | Finkelstein | Aug. 12, 1958 |
| 2,890,403 | Van Abbe | June 9, 1959 |
| 2,891,192 | Goodrich | June 16, 1959 |
| 2,895,081 | Crownover et al. | Feb. 14, 1959 |
| 2,926,284 | Finkelstein et al. | Feb. 23, 1960 |
| 2,957,145 | Bernstein | Oct. 18, 1960 |

FOREIGN PATENTS

| | | |
|---|---|---|
| 530,541 | Belgium | Jan. 20, 1955 |

OTHER REFERENCES

Transistor Power Supplies, by L. H. Light in Wireless World, December 1955, pages 582–586.

Transistor Circuit Handbook, by Garner, published by Coyne Electrical School, Chicago, Illinois, 1957 edition, pages 77 and 78.